United States Patent Office 3,235,523
Patented Feb. 15, 1966

3,235,523
AQUEOUS SOLUTIONS OF POLYACRYLAMIDE
STABILIZED WITH THIOUREA
George F. Schurz, Oakley, and Keith R. McKennon, Concord, Calif., assignors to The Dow Chemical Company, Midland, Mich., a corporation of Delaware
No Drawing. Filed Oct. 25, 1961, Ser. No. 147,483
7 Claims. (Cl. 260—29.6)

This invention relates to acrylamide polymers. More particularly it relates to compositions of such polymers having improved stability to thermal and/or oxidative breakdown comprising a small quantity of thiourea.

It has been observed that high molecular weight polymers and copolymers of acrylamide undergo degradation or molecular weight breakdown during heating at elevated temperatures. It has also been observed that the activity of water-soluble acrylamide polymers, when employed, for example, as flocculants in an aqueous medium, is often significantly reduced within a few hours after dissolving the polymer. Similarly, it has been observed that acrylamide polymers undergo degradation or molecular weight breakdown during drying of an aqueous solution of such polymers, as well as during dry storage of these polymers.

While the exact mechanism by which such degradation occurs is not known, it is believed to be prompted by one or more agents such as oxygen and metal ions capable of existing in two valence states such as, for example, iron and copper and the like. Generally suspect are materials which are capable of forming or contributing to the formation of a redox system. Such agents may be contained in the polymer or water as impurities or deliberately incorporated therein for other purposes. Exemplary of the latter instance are the teachings in the United States Patent 2,960,486 wherein sulfites are added added to acrylamide polymers to reduce residual acrylamide monomer. The sulfites also prevent degradation of the polymer solution in the absence of air or oxygen. However, when exposed to an oxidizing agent, these sulfites have a pronounced propensity to induce degradation of the dissolved acrylamide polymer. Chain degradation or molecular weight breakdown in acrylamide polymers is evidenced by decreases in the viscosity of aqueous solutions of the polymer.

Accordingly, the primary object of this invention is to provide a novel and improved composition comprising an acrylamide polymer.

It is a further object of this invention to provide an acrylamide polymer composition which is resistant to molecular weight breakdown due to thermal and/or oxidative agencies in aqueous solutions as evidenced by losses in solution viscosity. It is still another object of the invention to provide a solid acrylamide polymer composition resistant to molecular weight breakdown as evidenced by losses in solution viscosity. Still another object of this invention is to provide a method for preventing the thermal degradation of acrylamide polymers. Other objects will become apparent from the following specification and claims.

In accordance with the present invention, water-soluble, solid acrylamide polymers, especially those having high molecular weights, are stabilized or at least improved in resistance to thermal and/or oxidative degradation by intimately and uniformly incorporating therewith a small but effective quantity of thiourea. To accomplish satisfactory results, a water solution of the acrylamide polymer is prepared having dissolved therein from about 0.1 to 7 percent by weight of thiourea based on the weight of polymer. More specifically, for aqueous solutions containing from about 1.5 to 2 percent by weight of polyacrylamide, about 0.1 to 1 percent of thiourea by weight of polymer is used, preferably about 0.25 percent by weight.

In aqueous solutions or gels containing up to about 50 percent by weight of polyacrylamide and in addition thereto, from about 1 to 2 percent by weight of polymer of a sulfite such as sodium sulfite, about 0.1 to 7 percent by weight of thiourea is used, preferably about 0.25 to 1 percent by weight of polymer.

The term "acrylamide polymer" as employed in the present specification and claims refers to the homopolymers of acrylamide and water-soluble copolymers of acrylamide with other suitable monoethylenic monomers copolymerizable therewith. These acrylamide polymers are water-soluble, vinyl-type polymers characterized by substantial linearity, i.e., having little or no cross-linking between polymer chains. When the co-monomer polymerized with the acrylamide contains water-solubilizing groups, as, for example, in copolymers of acrylamide with acrylic acid, methacrylic acid, maleic acid, methacrylamide, vinylbenzylammonium compounds (such as trimethyl-vinylbenzylammonium chloride), vinylbenzene sulfonic acid, N-vinyloxazolidinones, N-vinylpyrrolidinones, N-vinylmorpholinones and the like, the copolymer contains up to about 50 mole percent of units derived from such co-monomers. However, with co-monomers containing no such hydrophilic groups, such as, for example, ethylene, butylene, styrene, alkyl esters of acrylic and methacrylic acid, vinylchloride, vinylidene chloride and the like, the copolymer contains no more than about 25 mole percent of the units derived from said co-monomers in amounts such that water-soluble copolymers result.

In carrying out the invention, the thiourea is incorporated into solutions of the acrylamide polymers in any convenient manner.

One procedure involves addition of the stabilizing component and the acrylamide polymer separately to a common aqueous medium. If the polymer is dissolved first, it is desirable to utilize efficient mixing devices such as mixing mills, pumps suitably designed or enclosed augers to accomplish a complete and uniform mixing of the additives throughout the polymer solution.

In another procedure, a sufficient quantity of the additive is first uniformly blended with the acrylamide polymer to inhibit degradation in the polymer when dissolved, and then utilizing the resulting composition to prepare stable aqueous solutions.

Still another mode of carrying out the invention involves dissolving the stabilizing agent in an aqueous solution of the acrylamide polymer and subsequently recovering a solid homogeneous dispersion of the stabilizing agent in acrylamide polymer by evaporating the water of solution. Temperatures employed in any evaporation process utilized to accomplish this result should be maintained below about 120° C., preferably about 100° C. in order to prevent an inordinate amount of cross-linking of the acrylamide polymer. Above 120° C., cross-linking resulting in the formation of water-insoluble materials increases substantially.

In a preferred mode of operation, an aqueous solution containing suitable amounts of thiourea is mixed with an aqueous solution of the acrylamide polymer in relative proportions as to provide the ultimately desired concentration of the stabilizing component in the aqueous polymer solution. The resulting composition can be heated at a temperature of about 100° C. to evaporate the water of solution if the recovery of a solid product is desirable.

The aqueous acrylamide polymer solutions stabilized in accordance with this invention exhibit smaller decreases in viscosity in the presence of oxygen, ferric ions and like degradative agents, over wide ranges in pH.

The viscosity stability is directly correlated with a reduced propensity of the acrylamide polymer to undergo molecular weight breakdown, by thermal and/or oxidative agencies.

The following examples are illustrative of the present invention but are not to be construed as limiting its scope.

*Example 1*

A quantity of 100 grams of an aqueous solution was prepared by dissolving in water 1.5 grams of a water-soluble polymer composition consisting essentially of a homopolymer of acrylamide having about 4 percent of the amide groups hydrolyzed to carboxyl groups, and a small amount of sodium bisulfite. The sodium bisulfite had been introduced into the polymer composition in an amount of about 6.7 percent by weight based on the polymer to reduce any free monomer present. The above-prepared composition is hereinafter designated Solution "A."

To a second acrylamide polymer solution, hereinafter designated Solution "B," prepared identically to that above, was added 0.1 gram of thiourea.

Both solutions thus prepared were placed in open bottles and heated at about 70° C. to 80° C. for 2 hours in the presence of a continuous stream of oxygen.

Viscosities measured in centipoises were determined for each polymer solution at 25° C. and at pH of 3.5 before and after heating by means of a Brookfield viscosimeter. The results of these measurements and the percent loss of viscosity after heating are reported in the following Table 1. The initial polymer solution viscosity before heating is designated as $N_0$ and that 2 hours subsequent to heating is designated as $N_2$.

TABLE 1

| Polymer solution | $N_0$, cps. | $N_2$, cps. | Percent loss of viscosity ($N_0-N_2/N_0\times100$) |
|---|---|---|---|
| "A" | 48.2 | 27 | 43.9 |
| "B" | 48.2 | 50.5 | 0 |

*Example 2*

A homopolymer of acrylamide similar to that employed in Example 1, which had been treated with 2 percent sodium sulfite, was dissolved in water. Enough of the polymer was dissolved to provide 2 percent by weight of the polymer in solution. The above-prepared composition is hereinafter designated Solution "A."

To a second acrylamide polymer solution hereinafter designated Solution "B," prepared identically to that above, was added 0.5 percent by weight of polymer of thiourea.

Both solutions thus prepared were placed in open bottles at room temperature and air was bubbled through the solutions for a period of 72 hours.

Viscosities measured in centipoise were determined for each polymer solution using procedures described in Example 1. The results of these measurements and the percent loss of viscosity after heating are reported in Table 2. The initial polymer solution viscosity before heating is designated as $N_0$ and that 72 hours subsequent to heating is designated as $N_{72}$.

TABLE 2

| Polymer solution | $N_0$, cps. | $N_{72}$, cps. | Percent loss of viscosity ($N_0-N_{72}/N_0\times100$) |
|---|---|---|---|
| "A" | 640 | 350 | 45.3 |
| "B" | 640 | 770 | 0 |

*Example 3*

A sufficient amount of a homopolymer similar to that employed in Example 1 was dissolved in water to form an aqueous gel containing 30 percent by weight of polymer, and 10 ml. of water was subsequently added. The resulting gel and water mixture was thoroughly mixed and allowed to stand at room temperature for one hour, then dried for 90 minutes at 110° C. in a standard laboratory oven. The resulting dried, solid polymer was ground into fine particles and the particles dissolved in water to form 0.5 percent by weight solution. The above-prepared composition is hereinafter designated Solution "A."

To a second acrylamide polymer solution prepared identically to that above, was added 10 ml. of a 10 percent by weight aqueous solution of sodium bisulfite. The resulting solution was mixed, allowed to stand for one hour, dried, ground into fine particles and the particles dissolved in water to form a 0.5 percent by weight solution as described above. The above prepared composition is hereinafter designated Solution "B."

To a third acrylamide polymer solution, prepared identically to that above was added 10 ml. of a 10 percent by weight aqueous solution of sodium bisulfite containing 0.056 gram of thiourea. The resulting solution was mixed, allowed to stand for one hour, dried, ground into fine particles and the particles dissolved in water to form a 0.5 percent by weight solution as described above. The above-prepared composition is hereinafter designated Solution "C."

Viscosities measured in centipoise were determined for each polymer solution at 25° C. at a pH of 3.5 using an Ubbelhode viscosimeter. The results of these measurements and the percent loss of viscosity after drying and re-dissolving in water are reported in the following Table 3. The initial solution viscosity of a non-treated polyacrylamide gel is designated as $N_0$ and that of the treated solutions following drying and re-dissolving in water as $N_f$.

TABLE 3

| Polymer solution | $N_0$, cps. | $N_f$, cps. | Percent loss of viscosity ($N_0-N_f/N_0\times100$) |
|---|---|---|---|
| "A" | 29.3 | 13.7 | 53.2 |
| "B" | 29.3 | 6.9 | 76.5 |
| "C" | 29.3 | 20.1 | 31.4 |

The acrylamide polymer compositions described herein, tend to cross-link slightly during processing under the conditions described in the preceding examples, such cross-linking resulting in a slight increase in solution viscosity of the final product.

In a manner similar to that of the foregoing examples, water-soluble copolymers of acrylamide with one or more monomers such as methacrylamide, vinylbenzylammonium compounds, vinylbenzene sulfonic acid, N-vinylpyrrolidinone, N-vinylmorpholidone, ethylene, butylene, styrene, ethyl acrylate, methyl methacrylate, vinyl chloride or vinylidene chloride are dissolved in water in the presence of a small quantity of thiourea to achieve a comparable improvement in the resistance of acrylamide polymers to degradation.

What is claimed is:

1. A composition of a water-soluble acrylamide polymer and from about 0.1 to about 7 percent by weight of thiourea.

2. A composition of an aqueous solution of an acrylamide polymer having dissolved therein from about 0.1 to about 7 percent of thiourea based on the weight of the polymer.

3. A composition as claimed in claim 3 wherein the acrylamide polymer is polyacrylamide.

4. A composition of a solid acrylamide polymer in intimate admixture with from about 0.1 to about 7 percent of thiourea based on the weight of the polymer.

5. A composition as claimed in claim 4 wherein the acrylamide polymer is polyacrylamide.

6. In a method for improving the stability of acrylamide polymers to thermally induced molecular weight breakdown in aqueous solutions, the step of incorporating into the solution from about 0.1 to 7 percent by weight of thiourea.

7. In a method for improving the stability of solid acrylamide polymer to thermally induced molecular weight breakdown, the steps of forming an aqueous solution of said polymer, incorporating therein from about 0.1 to 7 percent by weight of thiourea, and recovering the solid admixture by evaporating the water of solution.

References Cited by the Examiner

UNITED STATES PATENTS 2,864,803  12/1958  Jones _____ 260—29.6
3,065,193  11/1962  Volk _____ 260—45.9

MURRAY TILLMAN, *Primary Examiner.*

LEON J. BERCOVITZ, *Examiner.*